US 8,340,682 B2

(12) United States Patent
Taylor et al.

(10) Patent No.: US 8,340,682 B2
(45) Date of Patent: Dec. 25, 2012

(54) METHOD FOR DISSEMINATING GEOLOCATION INFORMATION FOR NETWORK INFRASTRUCTURE DEVICES

(75) Inventors: Kirk S. Taylor, San Diego, CA (US); Jack Steenstra, San Diego, CA (US); Liren Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 297 days.

(21) Appl. No.: 11/483,067

(22) Filed: Jul. 6, 2006

(65) Prior Publication Data

US 2008/0101277 A1    May 1, 2008

(51) Int. Cl.
*H04W 24/00* (2009.01)

(52) U.S. Cl. .................................................. 455/456.1

(58) Field of Classification Search ............. 455/456.1
See application file for complete search history.

(56) References Cited

U.S. PATENT DOCUMENTS

| | | | |
|---|---|---|---|
| 5,874,903 A | | 2/1999 | Shuey et al. |
| 6,023,625 A | * | 2/2000 | Myers, Jr. ........................ 455/503 |
| 6,108,558 A | * | 8/2000 | Vanderspool, II ......... 455/456.2 |
| 6,453,168 B1 | * | 9/2002 | McCrady et al. ............... 455/517 |
| 6,484,034 B1 | * | 11/2002 | Tsunehara et al. ......... 455/456.6 |
| 6,996,632 B2 | * | 2/2006 | Levy et al. ...................... 709/248 |
| 7,035,652 B1 | * | 4/2006 | Kelkar .......................... 455/456.6 |
| 7,035,936 B2 | * | 4/2006 | Fouquet et al. ............... 709/238 |
| 7,242,947 B2 | * | 7/2007 | Niu et al. ..................... 455/456.1 |
| 7,321,331 B2 | * | 1/2008 | Andric et al. ................. 342/386 |
| 7,395,073 B2 | * | 7/2008 | Gwon et al. ............... 455/456.1 |
| 2002/0113735 A1 | | 8/2002 | Spratt |
| 2002/0160787 A1 | * | 10/2002 | Chen et al. ...................... 455/456 |
| 2002/0194266 A1 | * | 12/2002 | Brebner et al. ................ 709/203 |
| 2003/0036388 A1 | | 2/2003 | Rosen |
| 2003/0043022 A1 | | 3/2003 | Burgan et al. |
| 2003/0046022 A1 | | 3/2003 | Silverman |
| 2003/0058792 A1 | | 3/2003 | Shao et al. |
| 2003/0235155 A1 | | 12/2003 | Boivie et al. |
| 2004/0109417 A1 | * | 6/2004 | Castro et al. .................. 370/238 |

(Continued)

FOREIGN PATENT DOCUMENTS

EP      1134940 A      9/2001

(Continued)

OTHER PUBLICATIONS

International Search Report & Written Opinion dated Dec. 14, 2007 for PCT Application Serial No. PCT/US2007/072979, 14 Pages.

(Continued)

*Primary Examiner* — Marisol Figueroa
(74) *Attorney, Agent, or Firm* — Liberty E. Mann

(57) ABSTRACT

A scheme is provided for distributing reference geographical locations on a network. Geolocation information is integrated or associated with one or more network infrastructure devices to permit them to serve as reference points for the rest of the network. A reference geographical location associated with a network infrastructure device may be broadcast by the network infrastructure device over a network. Alternatively, other network devices may request reference geographical location from a network infrastructure device or obtain it from a network-accessible database that stores such geolocation information. Other network devices can then use the one or more reference geographical locations to determine their own geographical location. By allowing existing network devices to take advantage of the geolocation capability of its "neighboring" network devices, this scheme provides a convenient way to deliver geolocation to many network devices.

47 Claims, 7 Drawing Sheets

U.S. PATENT DOCUMENTS

| | | | |
|---|---|---|---|
| 2004/0116134 A1* | 6/2004 | Maeda et al. | 455/457 |
| 2005/0021738 A1 | 1/2005 | Goeller et al. | |
| 2005/0102391 A1 | 5/2005 | Ruutu et al. | |
| 2005/0135257 A1 | 6/2005 | Stephens et al. | |
| 2005/0148346 A1* | 7/2005 | Maloney et al. | 455/456.6 |
| 2005/0228613 A1* | 10/2005 | Fullerton et al. | 702/150 |
| 2006/0045011 A1 | 3/2006 | Aghvami et al. | |
| 2006/0172699 A1* | 8/2006 | Goto | 455/11.1 |
| 2007/0021123 A1* | 1/2007 | A'Rafat et al. | 455/446 |
| 2008/0010367 A1 | 1/2008 | Chen et al. | |
| 2009/0075672 A1* | 3/2009 | Jones et al. | 455/456.1 |

FOREIGN PATENT DOCUMENTS

| | | |
|---|---|---|
| EP | 1253437 A2 | 10/2002 |
| JP | 10503893 | 4/1998 |
| JP | 2004304755 A | 10/2004 |
| WO | 0157696 A | 8/2001 |
| WO | 0203091 A | 1/2002 |
| WO | 2006066212 A | 6/2006 |

OTHER PUBLICATIONS

International Search Report & Written Opinion dated Nov. 28, 2007 for PCT Application Serial No. PCT/US2007/072944, 14 Pages.
EP OA mailed Apr. 29, 2009 for EP Application Serial No. 07799370.7.1248, 5 pages.
OA mailed May 12, 2009 for U.S. Appl. No. 11/483,268, 28 pages.
Office Action for EP Application 07 799 370.7-1248 for Qualcomm, Inc., dated Apr. 29, 2009, 5 pages.
Final Office Action mailed Dec. 15, 2009 for U.S. Appl. No. 11/483,268, 33 pages.

* cited by examiner

METHOD FOR DISSEMINATING GEOLOCATION INFORMATION FOR NETWORK INFRASTRUCTURE DEVICES

REFERENCE TO CO-PENDING APPLICATIONS FOR PATENT

The present Application for Patent is related to the following co-pending U.S. Patent Application: "Geo-Locating End-User Devices on a Communication Network" by Liren Chen, et al., having Ser. No. 11/483,268, filed concurrently herewith, assigned to the assignee hereof, and expressly incorporated by reference herein.

BACKGROUND

1. Field

Various embodiments pertain to network devices, and more specifically to network infrastructure devices with knowledge of their own geographical location and a protocol that facilitates distribution of this geographical information to other network devices to facilitate geolocation on a network.

2. Background

The advent of IP-based networks has spawned many applications, including services that rely on, or benefit from, knowledge of geographical location information of network devices. However, the nature of IP networks makes it difficult to geographically locate devices on the network. That is, the geographical transparency of IP networks, where devices are identified by an IP address not location, makes it very difficult to identify the geographical location of network devices with any precision. This poses a problem when deploying services that rely on, or benefit from, knowing the geographical location of a network device. For example, voice-over-IP (VOIP) telephone communication services rely on knowing the geographical information of a telephone device to route emergency calls. An emergency call cannot be easily routed to a nearby call center without knowing the geographical location of the telephone device. In the event that the caller using a VOIP telephone is unable to provide an address, emergency services may be unable to locate the caller in any other way. Regulations of telephone services impose the need to locate a telephone device for emergency purposes.

Implementing geolocation support by including a global positioning device in each user network device, such as VOIP telephones, typically results in higher purchase costs for the user devices and, possibly, additional monthly service charges. Moreover, geolocation systems like GPS will typically not work well indoors where most phones are used. Alternatively, a preset or user-entered geographical location might be considered, but, since a network device may be moved to a different geographical location and reconnected to an IP network as part of normal use this method of geolocation for the network device is unreliable and impractical.

Thus, a way is needed to facilitate geolocation support for network devices on a communication network.

SUMMARY

A method is provided for disseminating geolocation information between network infrastructure devices. A geographical location of a reference network device is obtained and stored as part of the management information base of the reference network device. The geographical location may then be provided to other network devices on the communication network. Changes in the geographical location of the reference network device are also monitored and the geographical location is updated if the reference network device moves. The reference network device may be authorized to provide its geographical location to other network devices on the communication network.

The geographical location may be represented as a longitude and a latitude and may be automatically propagated to other network devices. A network time protocol that facilitates distance estimation between network devices by synchronizing their clocks may be supported. An expiration timestamp may be appended to the geographical location provided to other network devices, wherein the expiration timestamp indicates how long the geographical location can be relied on.

The geographical location of the reference network device may be (a) obtained from an onboard global positioning device, (b) a manually configured into the reference network device, or (c) derived by using other geographical locations for other reference network devices. In the case of (c) above, the geographical location of the reference network device may be obtained by (1) acquiring one or more reference geographical locations for other reference network devices, (2) determining one or more distances from the reference network device to each of the one or more reference geographical locations, and then (3) deriving the geographical location of the reference network device based on the one or more reference geographical locations of the other reference network devices and the one or more distances. The one or more reference geographical locations may be obtained from a root reference server on the communication network.

An accuracy indicator may be associated with the geographical location of the reference network device. This accuracy indicator may be provided along with the geographical location of the reference network device. The accuracy indicator may be determined based on one or more accuracy indicators associated with one or more reference geographical locations for other reference network devices. When updating the geographical location of the reference network device based on one or more new reference geographical locations for other reference network devices having associated accuracy indicators, the reference network device uses a particular reference geographical location only if its associated accuracy indicator is better than the accuracy indicator associated with the reference network device.

Another feature provides for (1) obtaining a reference geographical location associated with a second reference network device, (2) synchronizing a first clock in the reference network device with a second clock in the second reference network device, the synchronized first and second clocks facilitating a direct one-way trip time measurement between the reference infrastructure device and the second reference network device, (3) obtaining a one-way distance between the reference infrastructure device and the second reference network device based on the direct on-way trip time measurement, and (4) obtaining the geographical location associated with the reference network device based on the reference geographical location and the one-way distance. The direct one-way trip time measurement is performed for both a transmit path from the reference network device and a receive path to the reference network device. The transmit path may have a different transmission speed than the receive path.

Another aspect provides for (1) determining the transmission medium between the reference network device and the second reference network device, (2) determining a propagation speed of the transmission medium, (3) obtaining a propagation time between the reference network device and the second reference network device based on the transmission medium propagation speed between the reference network device and the second reference network device, and (4) obtaining the geographical location associated with the reference network device based on the reference geographical location and the propagation time.

A network device is also provided having (a) an input interface configured to obtain a geographical location associated with the network device, (b) a processing circuit coupled to the input interface, and/or (c) an output interface coupled to the processing circuit to transmit the geographical location over a communication network to other network devices. The processing circuit may be configured to (1) obtain the geographical location from the interface, (2) store the geographical location as part of the management information base of the reference network device, (3) automatically propagate the geographical information to other network devices via the output interface, and/or (4) monitor for changes in the geographical location of the network device. The input interface may be coupled to one of either: an internal geolocation device, an external geolocation device, or a user input device for manual entry of geolocation information.

The input interface may be a local interface to couple directly to a reference infrastructure device to obtain a reference geographical location. In some implementations, the network infrastructure device knows the transmission medium to the reference infrastructure device and a propagation speed of the transmission medium. The transmission medium propagation speed is used to obtain a propagation time to the reference infrastructure device and the geographical location associated with the network infrastructure device is obtained based on the reference geographical location and the propagation time to the reference infrastructure device. The network infrastructure device may also include first clock to synchronize with a second clock in the reference infrastructure device. The synchronized first and second clocks facilitating a direct one-way trip time measurement between the network infrastructure device and the reference infrastructure device. The direct one-way trip time measurement is performed for both a transmit path from the network infrastructure device and a receive path to the network infrastructure device.

Yet another embodiment provides a machine-readable medium having one or more instructions for enabling a network device to facilitate propagation of geolocation information on a communication network, which when executed by a processor causes the processor to: (a) obtain a reference geographical location associated with a second network infrastructure device, (b) synchronize a first clock in the network infrastructure device with a second clock in the second network infrastructure device, the synchronized first and second clocks facilitating a direct one-way trip time measurement between the network infrastructure device and the second network infrastructure device, (c) obtain a one-way distance between the network infrastructure device and the second network infrastructure device based on the direct on-way trip time measurement, (d) obtain a geographical location associated with the network infrastructure device based on the reference geographical location and the one-way distance, and (e) provide the geographical location to a third network device on the communication network to enable the third network device to obtain its own geographical location.

Yet another feature provides a method for disseminating geolocation information across a network, comprising: (a) providing a reference geographical location from a reference network infrastructure device to other network infrastructure devices on the network, (b) synchronizing clocks between the reference network device and a first network infrastructure device to facilitate a one-way trip time measurement between the reference network infrastructure device and the first network infrastructure device, (c) obtaining a distance between the reference network device and the first network infrastructure device based on the one-way trip time measurement, and (d) obtaining a geographical location for the first network infrastructure device based on the reference geographical location and the distance between the reference network device and the first network infrastructure device. The method may compensate for time delays caused be intervening network devices between the reference network device and the first network infrastructure device to enhance the accuracy of the distance between the reference network infrastructure device and the first network infrastructure device. Additionally, the method may include the steps of (a) obtaining a roundtrip time measurement between the reference network infrastructure device and a non-synchronized network infrastructure device, (b) ascertaining processing delays at the non-synchronized network infrastructure device, (c) obtaining a distance between the reference network device and the non-synchronized network infrastructure device based on the roundtrip time measurement and compensating for the processing delays, and (d) obtaining a geographical location for the non-synchronized network infrastructure device based on the reference geographical location and the distance between the reference network device and the non-synchronized network infrastructure device.

DETAILED DESCRIPTION

Figure 1:
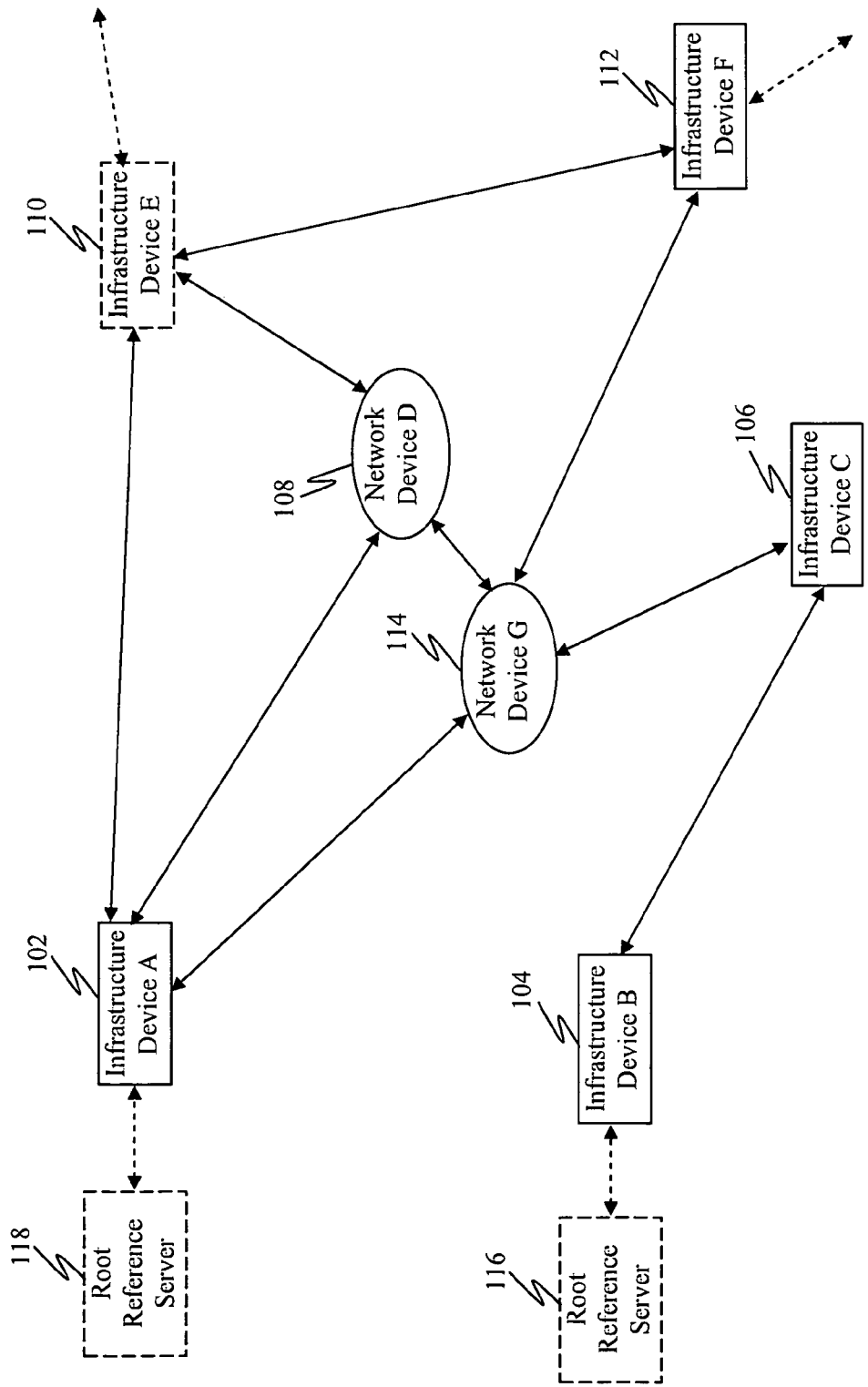
FIG. 1 illustrates a network in which one or more reference infrastructure devices include geolocation information that enables other network devices to determine their own geographical location.

In the following description, specific details are given to provide a thorough understanding of the embodiments. However, it will be understood by one of ordinary skill in the art that the embodiments may be practiced without these specific details. For example, circuits may not be shown in block diagrams in order not to obscure the embodiments in unnecessary detail.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine readable mediums for storing information. The term "machine readable medium" includes, but is not limited to portable or fixed storage devices, optical storage devices, wireless channels, and various other mediums capable of storing, containing, or carrying instruction(s) and/or data.

Furthermore, embodiments may be implemented by hardware, software, firmware, middleware, microcode, or a combination thereof. When implemented in software, firmware, middleware, or microcode, the program code or code segments to perform the necessary tasks may be stored in a machine-readable medium such as a storage medium or other storage means. A processor may perform the necessary tasks. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, and the like, may be passed, forwarded, or transmitted via a suitable means including memory sharing, message passing, token passing, and network transmission, among others.

Introduction

One feature provides a network of reference infrastructure devices with known geographical locations that facilitate geolocating other network devices. The reference infrastructure devices serve as geographical reference points and propagate their geographical locations to be used for geolocation by other network devices. In various implementations, the reference infrastructure devices have highly accurate geographical locations provided by manual configuration, an onboard geolocation device (e.g., GPS), or other means. Additionally, a network infrastructure device may ascertain its own geographical location by obtaining the location of one or more neighboring reference infrastructure devices and the distance(s) to the one or more neighboring reference infrastructure devices.

Reference geographical location information may be propagated through a data or communication network in various ways that allow other network devices to obtain their own geographical location. A reference geographical location may be broadcasted or distributed by a reference infrastructure device or requested by other network devices. Additionally, the reference geographical locations may be stored and/or maintained by one or more databases that network devices can access to facilitate geolocation. Existing network devices may take advantage of the geographical locations of "neighboring" reference infrastructure devices to ascertain their own geographical locations.

Geolocation Dissemination Scheme

Generally

FIG. 1 illustrates a network in which one or more reference infrastructure devices include geolocation information that enables other network devices to determine their own geographical location. The network may include a plurality of reference infrastructure devices A 102, B 104, C 106, E 110, and F 112, each of which may be communicatively coupled to other network devices. Since most network infrastructure devices, including routers, servers, modems, hubs and switches, rarely move, they are ideal candidates to be used as geographical reference points in order to enable geolocation of other network devices. In some implementations, infrastructure devices A 102, B 104, C 106, and F 112 may obtain their geographical location via an integrated or external geolocation device, such as a GPS device, or from a manually-entered geographical configuration. By deploying reference geolocation information only on the network infrastructure devices, the cost of deploying geolocation on a network is reduced. In other instances, the infrastructure devices may, instead, be manually configured with a geographical location. This is particularly effective where a network infrastructure device is rarely moved or if its position is properly maintained. These geographical locations may then serve as reference geographical points for other network devices 108, 110, and 114.

Infrastructure Device with Internally Generated or Stored Geolocation Information Some network infrastructure devices may store their reference geographical locations internally (e.g., in the network device). In some implementations, the reference geographical locations may also be stored by an external database that stores IP addresses of network infrastructure devices and their corresponding geographical locations. This may permit other network devices to obtain one or more stored geographical locations based on IP addresses.

Infrastructure Device with Externally Obtained Geolocation Information

According to one feature, a network infrastructure device E 110 not equipped with an internal/external geolocation device or a user configured/entered geographical location may determine its own geographical location based on the reference geographical locations of one or more other infrastructure devices A 102, B 104, C 106, and/or F 112. That is, infrastructure device E 110 may receive broadcasts from, or query, infrastructure devices A 102 and F 112, for example, to obtain two reference geographical locations. It can then determine the distances to each infrastructure device A 102 and F 112 in various ways. As described with reference to FIG. 6, distance determination between two infrastructure devices may be in various ways. Once distances to infrastructure devices A 102 and F 112 are determined, infrastructure device 110 can use these and the corresponding reference geographical locations to obtain its own geographical location.

Geolocation Propagation Schemes

Generally

A protocol may be established on the network that permits network infrastructure devices A 102, B 104, C 106, E 110, and F 112 to propagate their geographical location to other network devices or provide it upon request. In one implementation, network device 202 broadcasts its geographical location to the network periodically and/or upon the occurrence of an event (e.g., new geographical information is detected, etc.). In other implementations, network device 202 sends its geographical information to a requesting network device. According to one example, the geographical information of a plurality of network devices may be stored in a network database, along with identifying information (e.g., IP address) for the corresponding network device. This enables a network device seeking geolocation to obtain reference geographical locations with which to determine its own geographical location.

Passive Reception of Broadcast Information

A network infrastructure device that already knows its current geographical location may provide this reference geographical location by broadcasting it on the network. For example, network infrastructure devices A 102, B 104, C 106, E 110, and F 112 may broadcast their geolocation information along with a device identifier (e.g., device ID, IP address, media access control ID, etc.). The network infrastructure devices may broadcast this information periodically, based on a schedule, and/or when their geographical location information changes. Neighboring network devices passively receive such broadcasts and use the geolocation information therein to determine their own geographical locations.

Active Discovery

An active discovery mechanism may also be provided by which a network device may identify the local network infrastructure devices that can serve as geolocation reference points. Network infrastructure devices A 102, B 104, C 106, E 110, and F 112 may disseminate their current geographical location to other network devices by responding to a query or request for such information. This may be done by a network device querying or otherwise obtaining identifying information from "neighboring" reference network infrastructure devices. Once one or more network infrastructure devices are identified, a network device may obtain or request geolocation information from the identified network infrastructure devices. For instance, since most network devices support remote monitoring protocols, such as the Simple Network Management Protocol (SNMP), the geographical location of a particular network infrastructure device can be obtained by other network devices having access privileges to such information. For example, the IP address of a network infrastructure device (having a reference geographical location) may be used to query its geographical location from its management information base (MIB). Alternatively, network infrastructure devices may respond to specific requests for their geolocation information from other network devices.

Geolocation Expiration Timestamp

One feature also enables a reference network infrastructure device to control the length of time that its' broadcasted or distributed geolocation information should be used by receiving network devices. This feature gives a network infrastructure device control of how long its geographical location is good for. This may be achieved by appending an expiration timestamp or date to the reference geographic location distributed by the network infrastructure device. In this example, it is assumed that the reference network infrastructure device is in the best position to determine how often it changes locations and set the expiration timestamp accordingly. Network devices receiving this reference geographical location information and expiration timestamp rely on the reference geographical location for the period defined by the expiration timestamp and stops using it after that. The reference network infrastructure device can update its geolocation information to account for movements. Expiration timestamps also help avoid the use of invalid/outdated geographical locations by network devices.

Authorization of Reference Infrastructure Devices

Yet another aspect provides a mechanism to identify and authenticate infrastructure devices that are sending or requesting geolocation information. For this purpose, an infrastructure device may be provisioned with an identifier, authorization key, and/or unique key (e.g., either from a management server 118, self-generated or manually configured). In one implementation, this permits other network devices to determine whether the geolocation information received from another infrastructure device should be considered a valid reference geographical location. In another implementation, a reference network device may encrypt the geolocation information being broadcasted using its' keys to avoid unauthorized eavesdropping. In yet another implementation, an infrastructure device may not be allowed to broadcast or disseminate its geolocation information to other devices unless it is authorized to do so. The management server 118 may authorize one or more infrastructure devices A 102, B 102, C 106, E 110, and/or F 112 to act as reference infrastructure devices and allow them to broadcast or disseminate their geographical locations.

Root Reference Server

In yet another implementation, geolocation information may be disseminated to infrastructure device or network devices via a root reference server 116. For example, the root reference server 116 may operate as a central database of reference infrastructure devices or reference geographical information. Network devices may be configured to contact the root reference server 116 to obtain geolocation information (e.g., network infrastructure device identifiers and/or their associated geographical locations).

In one implementation, root reference server 116 provides reference geographical locations of "neighboring" network infrastructure devices from which a network device, including a network infrastructure device, can determine its own geographical location. That is, network infrastructure devices without onboard or configured geographical locations may determine their geographical locations by obtaining one or more reference geographical points from root reference server 116 and determining the distances to the infrastructure devices associated with the reference geographical points.

In other implementations, the root reference server 116 may be used as a reference geographical location itself. This permits a network device to use the location of root reference server 116 (and possibly other root reference servers) and determine a distance to the root reference server 116 to obtain its geographical location.

Stratum Propagation

The source and/or accuracy of reference geographical locations may be a factor in deciding which network infrastructure devices A 102, B 104, C 106, E 110, and F 112 to use as geographical reference points. Preferably, these reference geographical locations have the highest level of accuracy (e.g., stratum 0). However, in some implementations, a geographical location may be derived from a combination of reference geographical locations having different levels of accuracy (e.g., stratums 0, 1, 2, 3, etc.).

As a general rule, reference geographical locations of higher accuracy and/or reliability are preferred over less accurate or reliable geographical locations. In addition, reference network infrastructure devices that have been configured with highly accurate geographical information (e.g., a specifically surveyed geographical location) are preferred over other reference network infrastructure devices having less precise or reliable geographical information (e.g., GPS-based geographical data or geographical information derived from other neighboring devices, etc.). Thus, geolocation information from network infrastructure devices having more accurate position information are preferred over other network infrastructure devices that may have less accurate geographical locations. For this purpose, network infrastructure devices may provide the accuracy of their geographical information (e.g., stratum 0, 1, 2, etc.) when disseminating the geographical information. Generally, stratum 0 indicates the highest level of accuracy/confidence with increasing stratums being less accurate.

A "stratum" may act as an indicator of how may hops a particular network infrastructure device is from a source device having original geolocation information (e.g., obtained from an attached GPS device or manually configured). A network device that derives its geographical location from a second network device automatically increments its stratum level from the stratum level of the second network device. Source network devices may start with different stratum levels based on the quality of their geolocation location information (e.g. GPS, survey, map estimation, etc.) and all geolocation derivations have associated stratum levels that go up from that reference stratum level. This provides a simple method for managing stratum numbers and prevents looping by only using geolocation information having an associated stratum level equal or lower than its own stratum level.

A network infrastructure device A 102, B 104, C 106, E 110, or F 112 and/or its geographical location information may be associated with a level of accuracy (e.g., stratum 0, 1, 2, etc.) based on the accuracy of its geographical location information (e.g., the source of the geographical information, the number of physical hops from the actual source of the geographical information, etc.). For example, network infrastructure devices A 102, B 104, C 106, and F 112 may be categorized as stratum 0 devices (e.g., having the highest level of accuracy). Network infrastructure device E 110 may be an infrastructure device that derives its geographical location based on reference geographical locations from network infrastructure devices A 102 and F 112, both stratum 0 devices, thus network device E 110 is stratum 1. Similarly, other network infrastructure devices may be categorized as stratum 2, 3, etc., based on the relative accuracy of the source of their geolocation information. The specific categorization of a geographical location as stratum 0, 1, 2, etc., may vary depending on the particular geolocation scheme employed, the relative accuracy of the geographical location, etc. For example, as discussed above, the stratum level of a network device may be obtained by incrementing by one the stratum level of its source for geolocation information.

Anti-Looping of Stratums

One feature of the accuracy indicator provides an anti-looping mechanism that prevents network infrastructure devices (as well as regular network devices) from updating their geographical locations based on less accurate reference geolocation information. Since a network infrastructure device (or regular network device) knows the accuracy of its own geographical location information (based on the associated stratum level), it can avoid updating it based on a newly received or updated reference geographical point of less accuracy (e.g., having a higher stratum level). For example, if a network device having stratum 1 accuracy receives a new reference geographical location of stratum 2 accuracy, it should ignore the new reference geographical location. In one implementation, a network device may only update its geolocation information based on reference geolocation information having a lower associated stratum level.

Infrastructure Device Hardware

Figure 2:
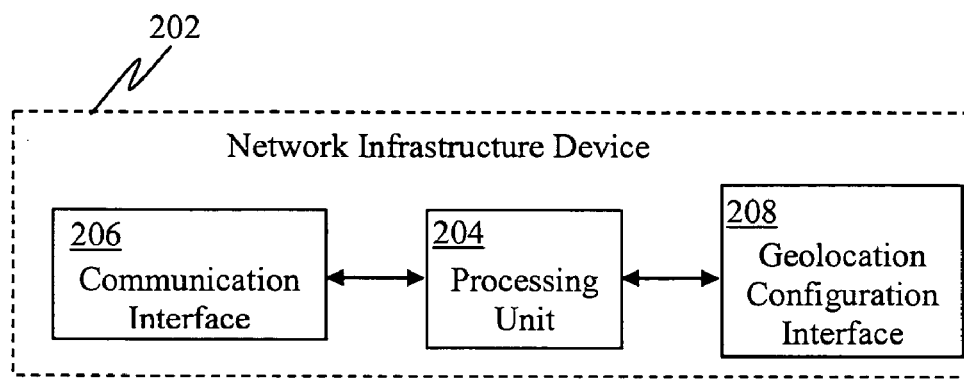
FIG. 2 illustrates a network infrastructure device having a geolocation configuration interface that enables it to obtain its geographic location and distribute it to other devices on a network.

FIG. 2 illustrates a network infrastructure device having a geolocation configuration interface that enables it to obtain its geographic location and distribute it to other devices on a network. Network infrastructure device 202 may include a processing unit 204 coupled to a communication interface 206 and a geolocation configuration interface 208. Communication interface 206 may serve to couple network infrastructure device 202 to a data and/or communication network. In some implementations, geolocation configuration interface 208 may be an integrated or external GPS device that provides a current or live geographical location to network infrastructure device 202. In other instances, geolocation configuration interface 208 may be a user interface or device interface that permits manually configuring the geographical location of network infrastructure device 202. For example, a geographical survey may be performed to obtain an accurate geographical location which is then configured into the network device via geolocation configuration interface 208. In some implementations, the geolocation information may be integrated with or stored as part of the management information base (MIB) of network infrastructure device 202.

Processing unit 204 may be configured to receive geolocation information from geolocation configuration interface 208 and store it and/or deliver it to other network devices. Optionally, processing unit 204 may also send or provide the level of accuracy, reliability, and/or confidence of the geographical location stored by network infrastructure device 202.

Method for Operating Network Infrastructure Device

Figure 3:
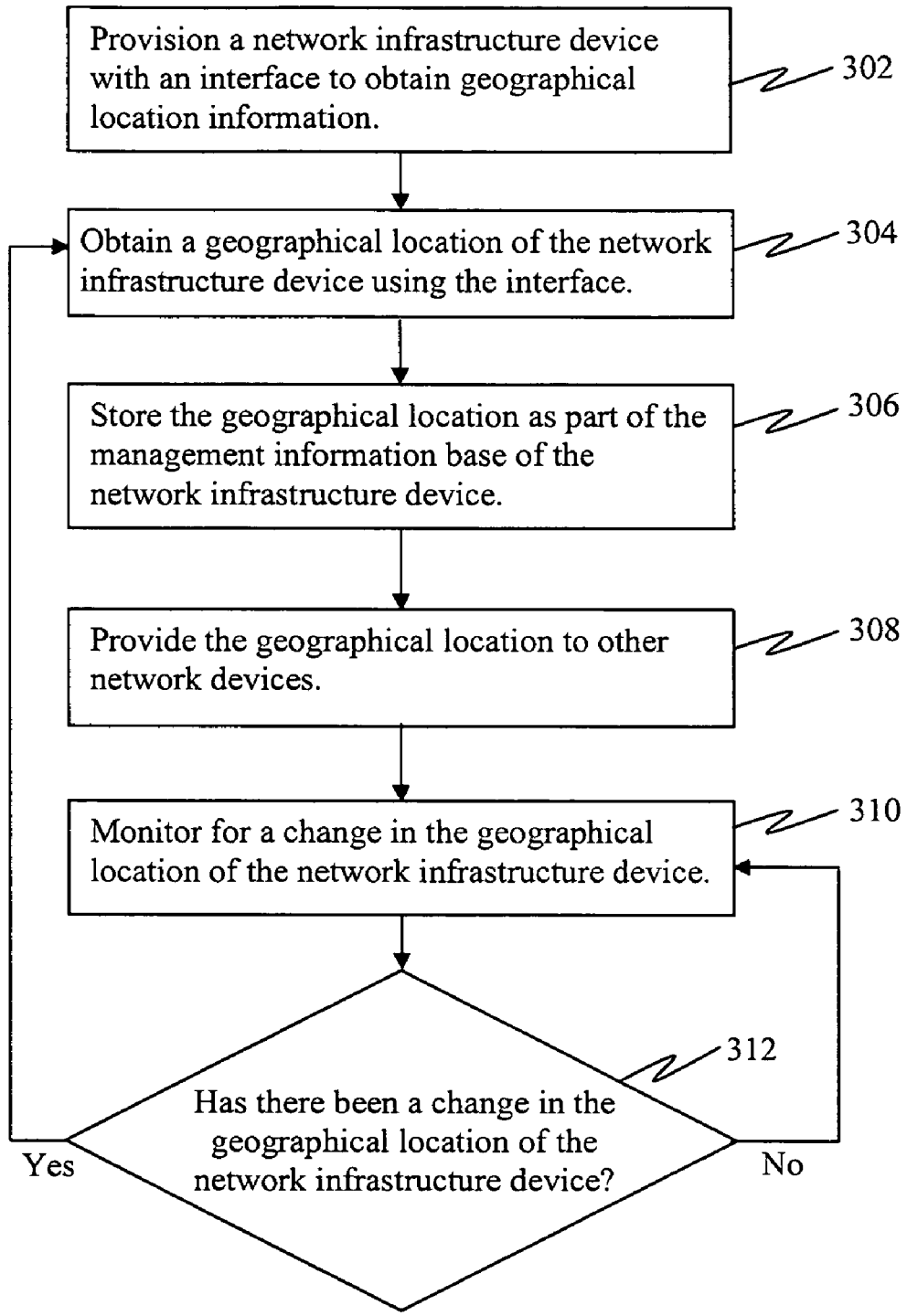
FIG. 3 illustrates a method for providing reference geolocation information to a network infrastructure device.

FIG. 3 illustrates a method for providing reference geolocation information to a network infrastructure device. A network infrastructure device is provisioned with an interface to obtain geographical location information 302. Such interface may enable the network infrastructure device to obtain its geographical location 304. For example, an internal or external device may be coupled to the interface and serve as a source of geographical position information or the interface may allow manually entry of this geographical information. The geographical information may be stored as part of a management information base of the network infrastructure device 306. The geographical location is then provided to other network devices 308. In various implementations, the geographical location may be propagated to other network devices via broadcasts, as a reply to an information request from a particular network device, or via one or more databases that maintain the geographical locations of network devices. This geographical information may enable implementation of particular types of geographically-dependent services over the network. The geographical location of the network infrastructure device may be monitored 310 to determine whether there has been a change 312. If there is a change, the new geographical location is obtained 304 and the process is repeated.

Network Device

Figure 4:
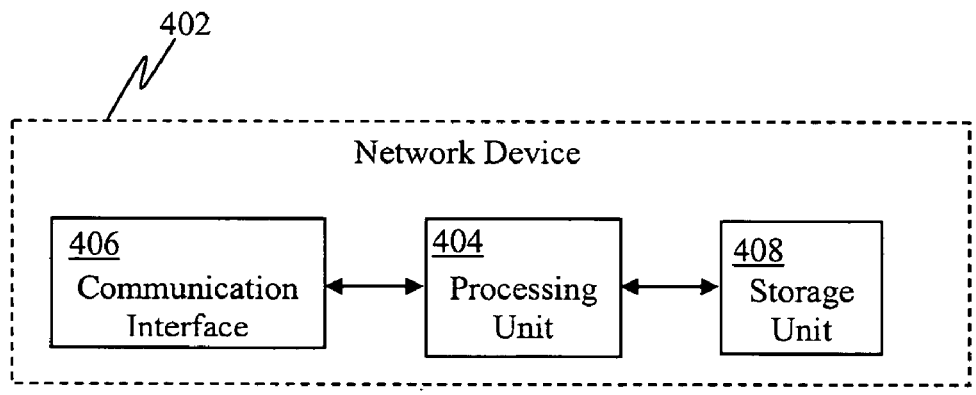
FIG. 4 illustrates a network device configured to determine a geographical location based on geographic information obtained from one or more network infrastructure devices.

FIG. 4 illustrates a network device configured to determine a geographical location based on geographic information obtained from one or more network infrastructure devices. In some implementations, network device 402 may be a network infrastructure device that has no onboard geolocation capabilities or configured geographical location. Network device 402 includes a processing unit 404 coupled to a communication interface 406 and a storage unit 408 (e.g., memory, etc.). Communication interface 406 may communicatively couple network device 402 to a data and/or communication network.

In one implementation, network device 402 is configured to determine its own geographical location by obtaining one or more reference geographical locations from network infrastructure devices (e.g., via received broadcasts, specific requests, or via a root reference server), then determining the distance to those network infrastructure devices, and triangulating its position based on this information. To identify network infrastructure devices that can serve as reference geographical locations, network device 402 may broadcast a request for network infrastructure devices to send or broadcast their geographical location. For example, neighboring network infrastructure devices within N hops (where N is an integer number) of the requesting network device may provide their geographical location. Alternatively, network device 402 listen for geolocation broadcasts from neighboring network infrastructure devices. In yet another implementation, network device 402 may contact a pre-defined root reference server from which it can obtain reference geolocation information or contact information for "neighboring" reference network infrastructure devices from which it can obtain reference geolocation information. Once one or more geographical locations are obtained, network device 402 can resolve the distances to the responding network infrastructure devices and determine its own geographical location.

Method for Operating Network Device

Figure 5:
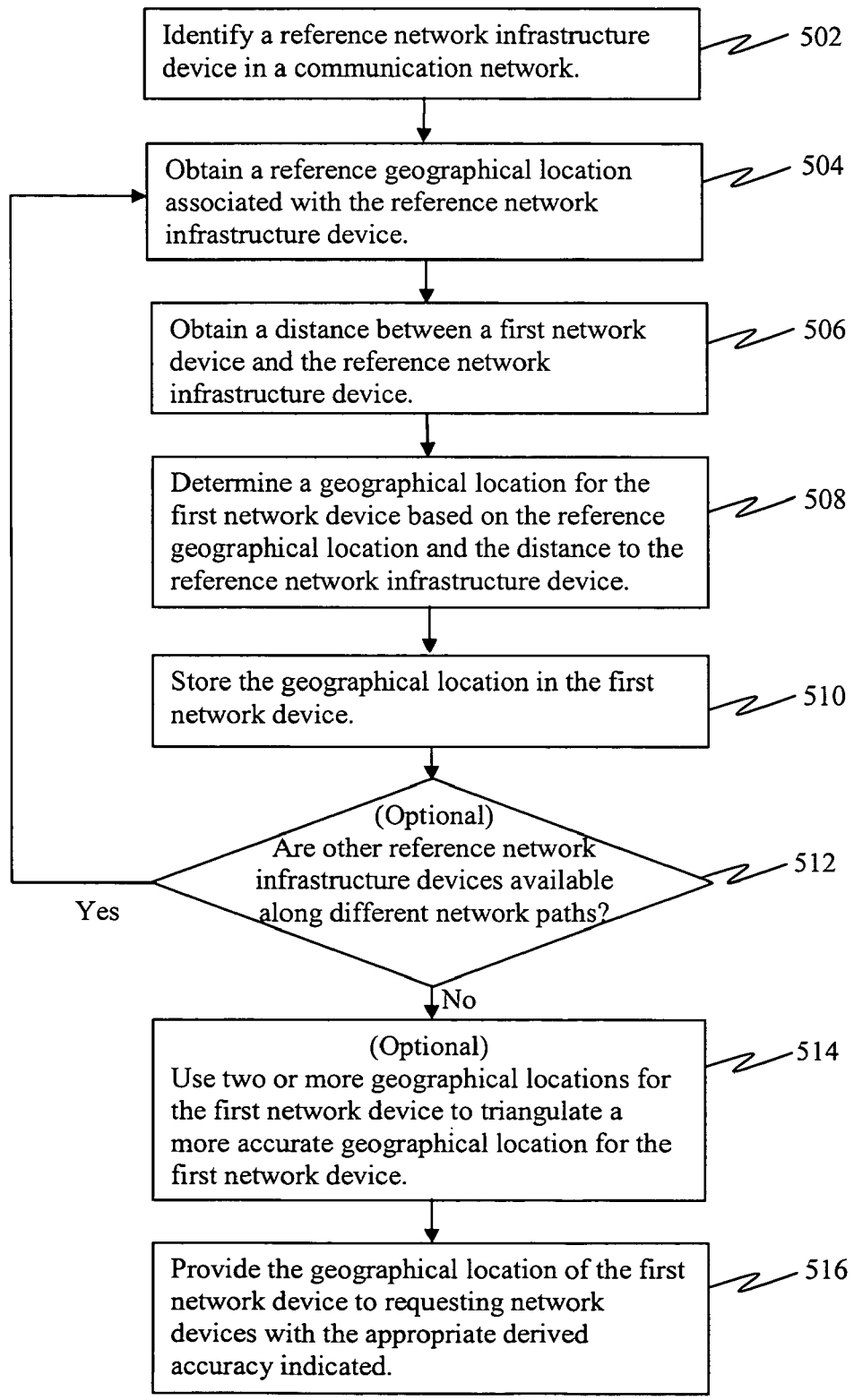
FIG. 5 illustrates a method for a first network device to determine its own geographical location based on reference geographical locations of one or more reference network infrastructure device on the network.

FIG. 5 illustrates a method for a first network device to determine its own geographical location based on reference geographical locations of one or more reference network infrastructure device on the network. The first network device may obtain reference location information from surrounding or nearby network infrastructure devices. Thus, a reference network infrastructure device in a data and/or communication network is identified 502. This may be done, for instance, by using a route trace utility to identify network infrastructure devices within N hops (where N is an integer value). Alternatively, the first network device may transmit a request for all reference network infrastructure devices within N network hops to provide their geolocation information. In yet another example, the first network device may listen to broadcasts of such reference geographical information from network infrastructure devices and store them for later use. Another example provides one or more databases (e.g., root reference servers) on the network that store geolocation information for reference network infrastructure devices and provide this information to other network devices. In this manner, a reference geographical location associated with the reference network infrastructure device 504 is obtained. Typically, the first network device preferably obtains geolocation information from a locally connected neighbor since more accurate data can be used to make the geolocation calculation. Two network devices are said to be locally connected (in Internet Protocol (IP) networking terminology), if the two network devices have no Layer 3 IP devices on the path between them. Otherwise their connection is considered "remote".

A distance from the first network device to reference network infrastructure device 506 is then determined. This may be done in several ways. For example, where a network time protocol is supported on the network, the clocks on network devices are synchronized and transmitted packets are time stamped. Using the transmit and receive times for packets between two network devices, the one-way delay time between them can be ascertained. Since most network infrastructure devices know the interface transmission speed and the type of medium (which determines the transmission medium propagation speed) for their communication interfaces, the propagation time between the two local network devices can be measured directly by removing the transmission time. If two network devices have a remote connection, the propagation time between them may be measured indirectly and a transmission medium propagation speed may be estimated. Knowing the propagation time and transmission medium propagation speed, the distance between the two network devices is then ascertainable. If synchronized clocks are not available on the network devices, then propagation time can still be estimated by taking measurements of roundtrip delay times and using the local clock to record transmit and receive times and dividing by two to ascertain the one-way delay time. Then the rest of the operations can proceed as outline above for local or remote connections as appropriate.

A geographical location for the first network device can then be determined based on the reference geographical location and distance to the reference network infrastructure device 508, taking into account the "stratum" level of their position accuracy. This calculated geographical location is then stored 510 in the first network device and may be provided to requesting network devices 516 with the appropriate derived accuracy indicated.

If other reference network infrastructure devices are available along different network paths 512, this process is repeated to obtain two or more geographical locations for the network device. These two or more geographical locations are then triangulated to obtain a more accurate geographical location for the first network device 514.

In one implementation, the method illustrated in FIG. 5 may be performed by a network device to obtain its own geographical location. In another implementation, the method illustrated in FIG. 5 is implemented by a network device to find the geographical location of other network devices on a communication network.

Infrastructure Device Location Determination Scheme

Figure 6:
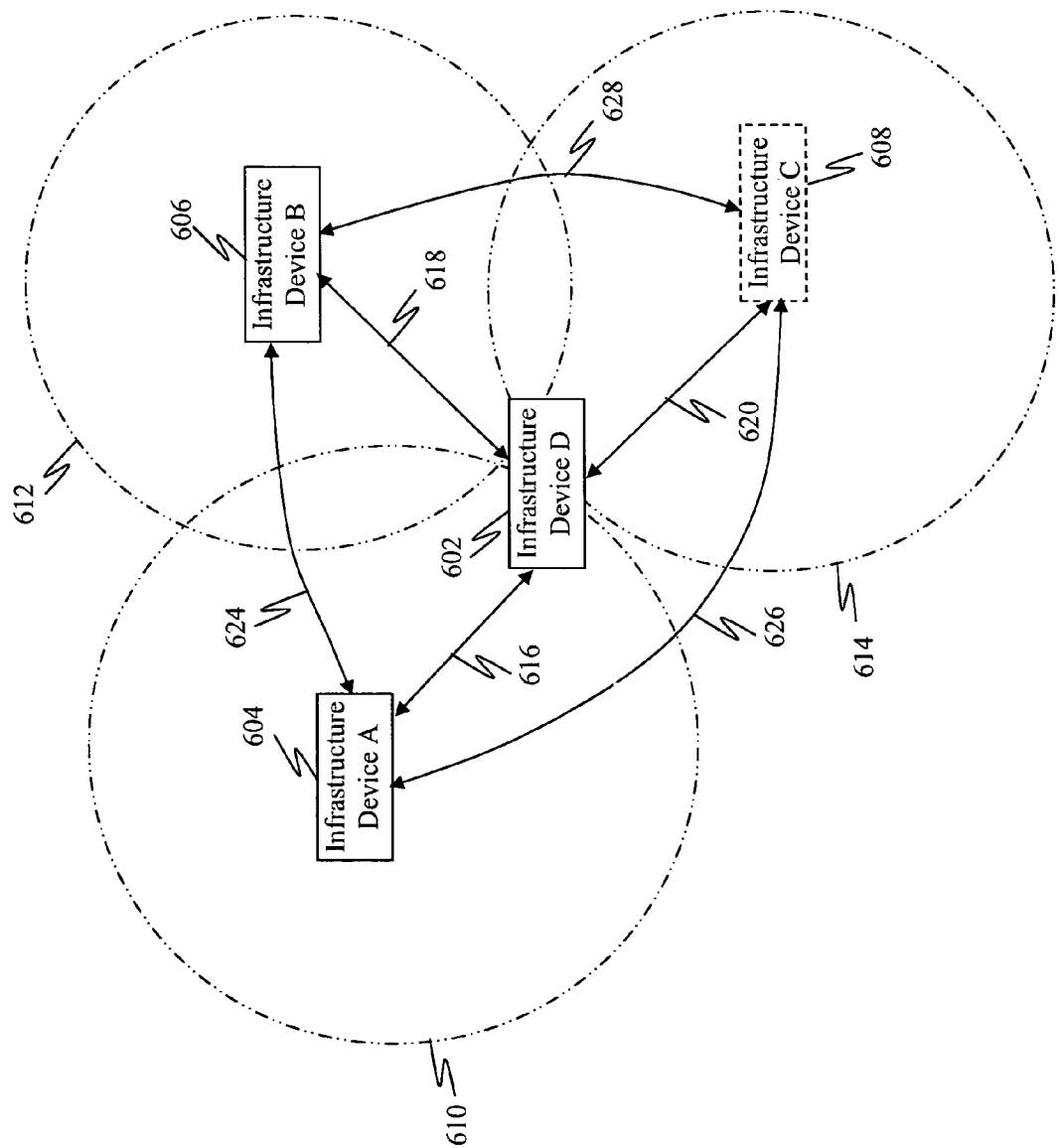
FIG. 6 is a diagram illustrating how the geographic location of a first network device may be determined based on the known geographic locations of other network devices.

FIG. 6 is a diagram illustrating how the geographic location of a first network device may be determined based on the known geographic locations of other network devices. In one example, the geographical locations of network infrastructure devices A 604, B 606, and C 608 are known and used as reference geographical locations by other network devices. Some of these network infrastructure devices may obtain their geographical locations from onboard GPS devices or manually configured locations and disseminate or broadcast their geographical locations over the network. Meanwhile, other participating network infrastructure devices may not have onboard GPS devices or manually configured locations but instead obtain their geographical locations by based on the known geographical location of neighboring network infrastructure devices and the distance to those devices. The distance between two network infrastructure devices may be determined based on the propagation time and transmission medium propagation speed along a path between the two network infrastructure devices. That is, the distance between two network infrastructure devices may be defined as the transmission medium propagation speed ($v_{propagation}$) times propagation time $t_{propagation}$. The distance determination between two network infrastructure devices may be done either "locally" or "remotely".

Local Distance Determination

Local distance determination can be performed when the network infrastructure devices are locally connected (by IP network definition) and are aware of the medium type and transmission medium propagation speed between the network infrastructure devices. In particular, in local distance determination the network infrastructure device is able to readily determine a propagation time $t_{propagation}$ and transmission medium propagation speed $v_{propagation}$.

Participating network infrastructure devices may support clock synchronization, for example, by employing a Network Time Protocol (NTP) that synchronizes the clocks of network infrastructure devices over packet-switched networks. For instance, a first network infrastructure device A 604 and a second network infrastructure device 606 B may have synchronized clocks. By appending a transmit timestamp to a transmitted packet from the first network infrastructure device A 604 to the second network infrastructure device B 606, second network infrastructure device B 606 is able to ascertain the one-way trip time of the packet across the local link 624. That is, when the packet is received by the second network infrastructure device B 606 a receive timestamp is created. By subtracting the transmit timestamp from the receive timestamp, the overall one-way trip time $t_{trip}$ is obtained. The trip time $t_{trip}$ is defined as the sum of a transmission time $t_{transmission}$ and a propagation time $t_{propagation}$. Consequently, the propagation time $t_{propagation}$ is $t_{propagation} = t_{trip} - t_{transmission}$ A network infrastructure device can obtain the transmission time $t_{transmission}$ for a received packet based on its known interface transmission speed $v_{transmission}$ and the received packet size P1. In particular $t_{transmission} = P1/v_{transmission}$ Thus the propagation time, $t_{propagation} = t_{trip} - P1/v_{transmission}$ can be ascertained, locally, by receiving network infrastructure device B 606. Most network infrastructure devices (e.g., Layer 3 network devices), such as routers, have knowledge of the physical transmission medium through which they are connected to a data or communication network or other infrastructure devices. For example, network infrastructure device B 606 may be a Layer 3 device that knows the transmission medium of path 624 through which it communicates with infrastructure device A 604. The transmission medium may be fiber optic, coaxial cable, etc., for example. In some instances, network infrastructure device B 606 may infer the transmission medium based on its interface transmission speed $v_{transmission}$. Knowing the transmission medium, a network infrastructure device can then obtain a transmission medium propagation speed $v_{propagation}$. For example, Table 1 defines known propagation speed $v_{propagation}$ for different transmission mediums that a network infrastructure device may use.

TABLE 1

| Transmission Medium | Propagation Speed |
|---|---|
| Thick Coaxial | .77 c (231,000 km/sec) |
| Thin Coaxial | .65 c (195,000 km/sec) |
| Twisted Pair Copper | .59 c (177,000 km/sec) |
| Fiber Optic | .66 c (198,000 km/sec) |
| AUI Cable | .65 c (195,000 km/sec) |

Having obtained a propagation time $t_{propagation}$ and transmission medium propagation speed $v_{propagation}$ over path 624, network infrastructure device B 606 can determine the distance to network infrastructure device A 604.

Additionally, making measurements with synchronized clocks allows the network infrastructure devices to make measurements of both the transmit and receive links between the network infrastructure devices. The same method described above can be applied to both sides of the path (e.g., transmit and receive) for cases where the physical link may have asymmetric bandwidth such as a cable modem or DSL links. Computation of the two propagation time measurements allows both pieces of data to be input into the geolocation determination process to increase accuracy. Generally, the shorter calculated distance is the more accurate measurement of the distance between the two network infrastructure devices.

For locally connected network infrastructure devices that do not have synchronized clocks, the local distance determination method may be modified to allow one network device to send a ping packet which records the round trip time (e.g., based on transmit and receive timestamps) between the two network devices via the clock on the network device that sends and receives the ping. Then the one-way trip time is obtained by dividing the measured round trip time by two.

Remote Distance Determination

Remote distance determination provides an alternative approach to local distance determination. Remote distance determination is performed when two network infrastructure devices have a remote IP connection. If the two network devices do not have synchronized clocks, then the following operation reviewed below is used. This method is covered in the co-pending U.S. Patent Application: "Geo-Locating End-User Devices on a Communication Network" by Liren Chen, et al.

In remote distance determination without synchronized clocks, the distance to a reference infrastructure device may be ascertained by using network pings. For example, a network infrastructure device C 608 may attempt to determine its geographic location based on the reference geographical location of network infrastructure device A 604. Separate roundtrip time measurements (e.g., pings) $t1_{roundtrip}$ and $t2_{roundtrip}$ are done by network infrastructure device C 608 over path 626 to network infrastructure device A 604 using different packet sizes P1 and P2. These time measurements may be accomplished, for example, by using a high-resolution pinging utility (e.g., having a resolution of 1 microsecond). The roundtrip time measurements maybe performed in close proximity in time so as to minimize the effects of varying network traffic or loads, and processing loads.

Roundtrip ping time $t1_{roundtrip}$ is defined as $t1_{transmission} + t1_{propagation}$, and a round-trip ping time $t2_{roundtrip}$ is defined as $t2_{transmission} + t2_{propagation}$. The propagation time is directly related to the transmission medium propagation speed of the electromagnetic signal across the physical medium of the path 626 and how far the signal has to travel. It is independent of the measuring packet size P1 or P2. Therefore, for the same path 626, $t1_{propagation}$ equals $t2_{propagation}$, referred to hereafter as $t_{propagation}$. This means that transmission times (e.g., $t1_{transmission}$ and $t2_{transmission}$) are determined by the size of the packet (e.g., P1 and P2) being transferred, divided by the bandwidth of the transmission path 626 times 2 (packet is sent twice). Often, the bandwidth is relatively stable when ping measurements are taken in close proximity in time. Therefore, $$t1_{roundtrip} = 2*(P1/\text{path\_bandwidth}) + t_{propagation}$$

$$t2_{roundtrip} = 2*(P2/\text{path\_bandwidth}) + t_{propagation}.$$

The path_bandwidth can then be calculated as the difference between packet sizes P2 and P1 divided by the difference in roundtrip ping times $t2_{roundtrip}$ and $t1_{roundtrip}$ times two (2) such that:

$$\text{path\_bandwidth} = 2*(P2-P1)/(t2_{roundtrip} - t1_{roundtrip}).$$

The roundtrip propagation time $t_{propagation}$ of path 626 can then be calculated as the difference between an overall path roundtrip time and the roundtrip transmission time, such that:

$$t_{propagation} = t_{roundtrip} - t_{transmission}, \text{ or}$$

$$t_{propagation} = t_{roundtrip} - P1 \times ((t2_{roundtrip} - t_{roundtrip})/(P2-P1)),$$

where P1 and P2 are different packet sizes sent between the two network infrastructure devices, and $t1_{roundtrip}$ and $t2_{roundtrip}$ are the respective roundtrip times for the packet sizes P1 and P2. Consequently, the one-way propagation time is given as $$t_{one-way\,propagation} = t_{propagation}/2.$$

A nominal transmission medium propagation speed $v_{propagation}$ for the path 626 transmission medium is then selected. Electromagnetic signals propagate at a constant speed on a transmission medium. Since the transmission medium of the path 626 may be characterized using the path bandwidth, a transmission medium propagation speed $v_{propagation}$ may be selected as the nominal transmission medium propagation speed for the path 626 based on the best characterization of the transmission medium. That is, depending on the determined path bandwidth, the path 626 may be characterized as twisted pair copper wire, coaxial cable, fiber optic, etc., and a transmission medium propagation speed $v_{propagation}$ based on that medium can then be used. Table 1 defines known transmission medium propagation speeds $v_{propagation}$ for different transmission mediums that a network infrastructure device may use.

The one-way distance of the path 626 can then be determined as:

$$\text{distance} = v_{propagation} \times t_{one-way\,propagation}$$

where $v_{propagation}$ is the transmission medium propagation speed for the path 626 and $t_{one-way\,propagation}$ is the one-way propagation time across path 626. In some implementations, multiple roundtrip time measurements are obtained and the smallest propagation time $t_{one-way\,propagation}$ is used to determine the distance between network infrastructure devices 604 and 608.

When clocks are synchronized between two network devices, then the above method is modified to measure the one-way trip times directly instead of measuring the roundtrip time and dividing it by two to estimate the one-way trip time. That is, a path_bandwidth is determined in both transmit and receive directions (from the point of reference of the first network device that is attempting its own geolocation determination) denoted by $\text{path\_bandwith}_T$ and $\text{path\_bandwidth}_R$. Then one-way propagation times, $t_{one-way\,propagationR}$ and $t_{one-way\,propagationT}$ can be computed (divide by two step from above is omitted) from the $\text{path\_bandwith}_T$ and $\text{path\_bandwidth}_R$. These two propagation times can now both be used as input to the geolocation determination process for better accuracy.

Intervening Network Devices

In some implementations a receiving network device, such as a Layer 3 router or other device, is able to use the information (e.g., a transmit timestamp, a physical medium type, interface transmission speed, queueing delay, link utilization, etc.) from a transmitting network infrastructure device and, possibly, intervening network devices, that may be sent in a network protocol packet, to help estimate the actual propagation time. From this information, a distance between the transmitting and receiving device may be determined more accurately.

Specifically, in the case of remote distance determination between two network devices where their clocks are unsynchronized, the receiving network device could include a processing time estimate in the ping packet that is to be sent back to the first network device performing the geolocation operation. Including the estimate of processing time by the receiver on the ping packet allows the calculation of real propagation time to be more accurate and thus the distance estimate may be more accurate. That is, round-trip time can more completely be written as $$t_{roundtrip} = t_{transmission} + t_{propagation} + t_{processing}$$

And $t_{processing}$ can be included in the return packet by the receiving network device to allow the transmitting network device to remove that time when calculating the estimated $t_{propagation}$.

This protocol may be extended to enable Layer 2 devices (e.g., network switches, etc.) to share their information (e.g., interface transmission speed, physical medium type, and possibly other information like estimated processing time, estimated queueing delay, link utilization, etc.), as well. That is, an intervening Layer 2 network device may append its information to a distance determination packet sent between two Layer 3 network devices, the receiving network device may be able to determine the delay caused by the intervening Layer 2 device and its associated links. By accounting for delays of intervening Layer 2 network devices and links, a Layer 3 network device may be able to more accurately determines its distance to another Layer 3 network device.

Location Triangulation

Network infrastructure devices may also be configured to use multiple reference geographical locations to more accurately determine their own geographical location. For any single distance measurement, a network infrastructure device D 602 may be located within a radius of reference network device A 604 along a perimeter region 610. To further narrow its location, multiple reference geographical locations are used to define multiple perimeter regions 610, 612, and 614.

From these multiple perimeter regions, a more accurate geographical location can be ascertained from the intersection or overlap of two or more perimeter regions 610, 612, and 614. Such intersection or overlap location may be determined from triangulation of the reference geographical locations (e.g., for network infrastructure devices A, B, and C) and the distances to the network infrastructure device D 602 along transmission paths 616, 620, and 624.

One or more of the components, steps, and/or functions illustrated in FIGS. 1, 2, 3, 4, 5 and/or 6 may be rearranged and/or combined into a single component, step, or function or embodied in several components, steps, or functions without departing from the invention. Additional elements, components, steps, and/or functions may also be added without departing from the invention. The apparatus, devices, and/or components illustrated in FIGS. 1, 2, 4 and/or 6 may be configured to perform one or more of the methods, features, or steps described in FIGS. 3 and/or 5. For example, FIGS. 7 and 8 illustrate other methods for disseminating geolocation information across a network while FIG. 9 illustrates an alternative geolocation infrastructure device.

Figure 7:
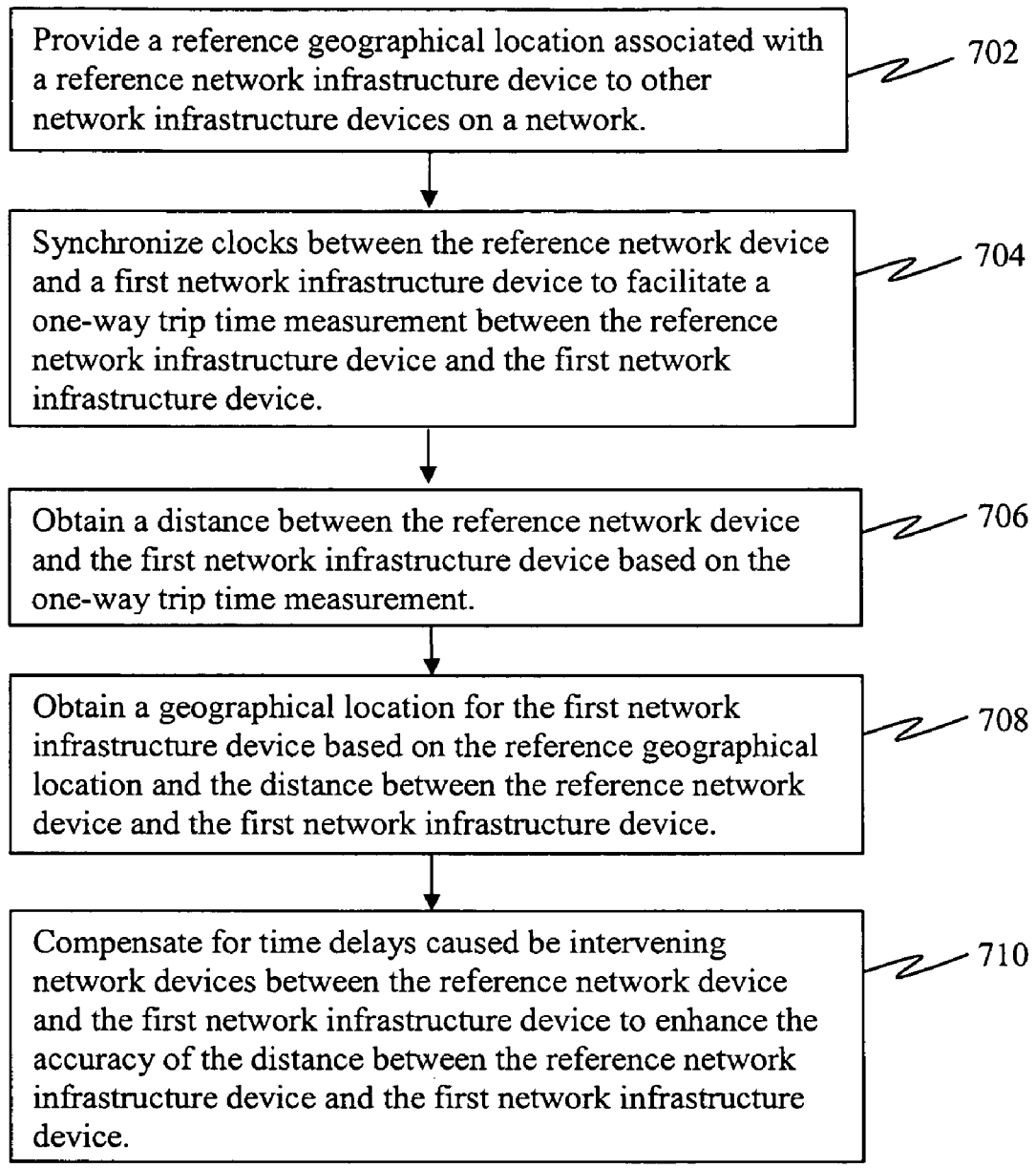
FIGS. 7 and 8 illustrate other methods for disseminating geolocation information across a network.

In FIG. 7, a reference geographical location associated with a reference network infrastructure device is provided to other network infrastructure devices on a network 702. Clocks between the reference network device and a first network infrastructure device are synchronized to facilitate a one-way trip time measurement between the reference network infrastructure device and the first network infrastructure device 704. A distance between the reference network device and the first network infrastructure device is obtained based on the one-way trip time measurement 706. A geographical location for the first network infrastructure device is obtained based on the reference geographical location and the distance between the reference network device and the first network infrastructure device 708. The method may also compensate for time delays caused be intervening network devices between the reference network device and the first network infrastructure device to enhance the accuracy of the distance between the reference network infrastructure device and the first network infrastructure device 710.

Figure 8:
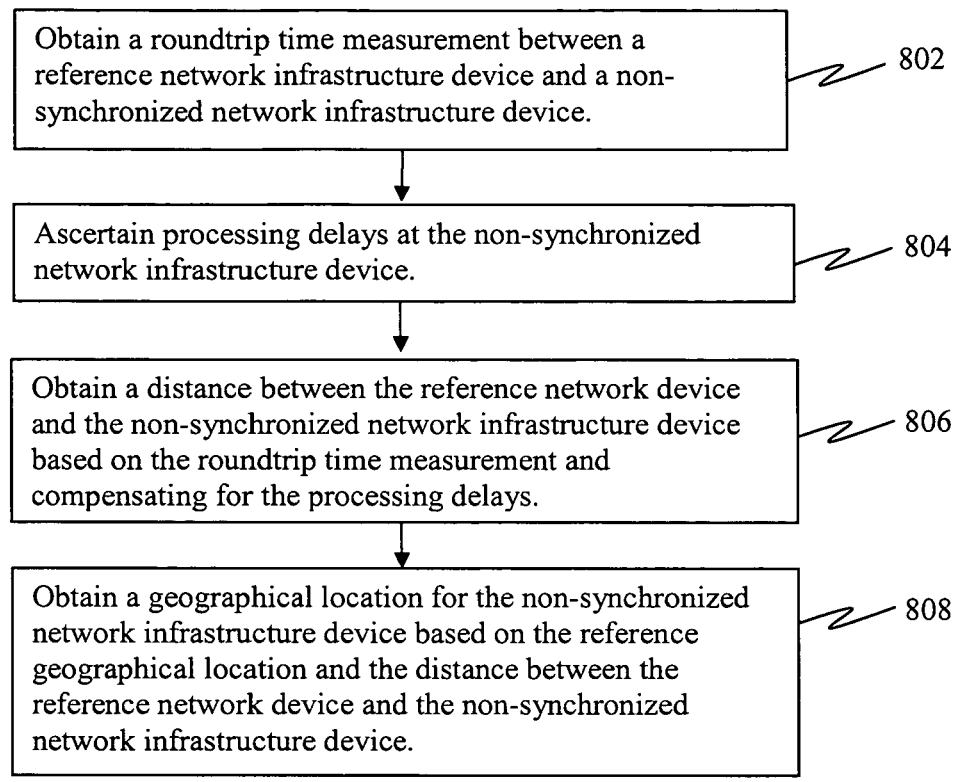

In FIG. 8, a roundtrip time measurement is obtained between a reference network infrastructure device and a non-synchronized network infrastructure device 802. Processing delays at the non-synchronized network infrastructure device are ascertained 804. A distance between the reference network device and the non-synchronized network infrastructure device is obtained based on the roundtrip time measurement and compensating for the processing delays 806. A geographical location for the non-synchronized network infrastructure device is obtained based on the reference geographical location and the distance between the reference network device and the non-synchronized network infrastructure device 808.

Figure 9:
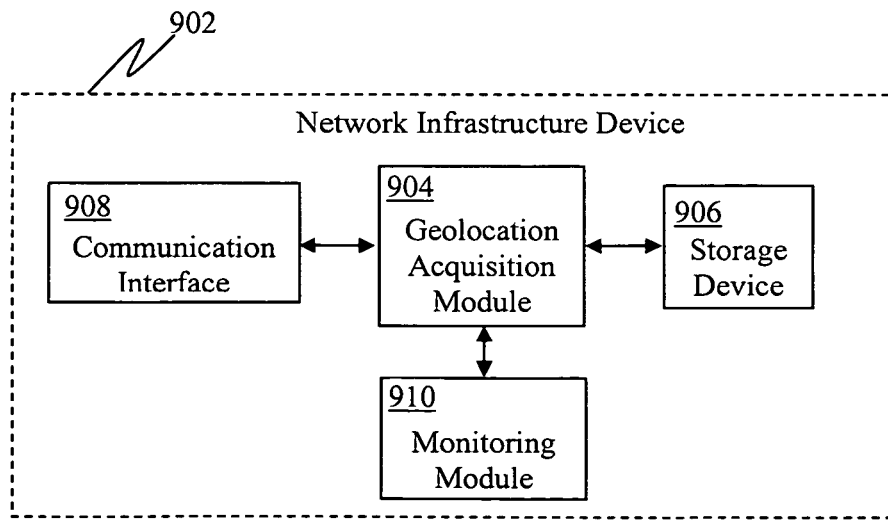
FIG. 9 illustrates an alternative geolocation infrastructure device.

FIG. 9 illustrates a network infrastructure device 902 including a geolocation acquisition module 904 for obtaining the geographical location of the network infrastructure device, a storage device 906 for storing the geographical location of the network infrastructure device 902, and a communication interface 908 for providing the geographical location of the network infrastructure device 902 to other network devices. Additionally, the network infrastructure device may include a monitoring module 910 for monitoring for a change in the geographical location of the network infrastructure device 902.

Accordingly, a network infrastructure device may comprise means for obtaining the geographical location of the network infrastructure device, means for storing the geographical location of the network infrastructure device, means for providing the geographical location of the network infrastructure device to other network devices, and/or means for monitoring for a change in the geographical location of the network infrastructure device.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method for disseminating geographical location information between network devices, comprising:
    obtaining a geographical location of a reference network device;
    storing the geographical location; and
    supporting a network time protocol that facilitates distance estimation between the reference network device and one or more other network devices by synchronizing their clocks;
    wherein the geographical location is provided to at least one of the one or more other network devices for determining a geographical location of the at least one of the one or more other network devices using packet exchanges based on the clock synchronization; and
    wherein a mechanism is provided to selectively identify and authenticate at least one network device as being authorized to act as the reference network device to the at least one of the one or more other network devices.

2. The method of claim 1, further comprising:
    monitoring for a change in the geographical location of the reference network device and updating the geographical location when the monitoring indicates a change in the geographical location of the reference network device.

3. The method of claim 1, wherein the geographical location includes a longitude and a latitude.

4. The method of claim 1, wherein the geographical location is automatically propagated to the one or more other network devices.

5. The method of claim 1, wherein the geographical location of the reference network device is obtained from an onboard global positioning device.

6. The method of claim 1, wherein the geographical location of the reference network device is manually configured into the reference network device.

7. The method of claim 1, wherein the geographical location of the reference network device is obtained by:
    acquiring one or more reference geographical locations for other reference network devices;
    determining one or more distances from the reference network device to each of the one or more reference geographical locations; and
    deriving the geographical location of the reference network device based on the one or more reference geographical locations of the other reference network devices and the one or more distances.

8. The method of claim 7, wherein the one or more reference geographical locations are obtained from a root reference server on the network.

9. The method of claim 1, further comprising:
including an indication of a level of accuracy of the geographical location in the geographical location of the reference network device, wherein the level of accuracy indicates a number of hops on the communication network that the reference network device is located from a source device with a geographic location information having a highest level of accuracy; and
providing the level of accuracy indication along with the geographical location.

10. The method of claim 9, wherein the level of accuracy indication is determined based on one or more level of accuracy indications associated with one or more reference geographical locations for other reference network devices.

11. The method of claim 9, further comprising:
updating the geographical location of the reference network device using only one or more other reference network device with a geographical location having a level of accuracy indication indicating an equal or greater accuracy than the level of accuracy of the reference network device.

12. The method of claim 1, further comprising:
appending an expiration timestamp to the geographical location provided to the at least one of the one or more other network devices, wherein the expiration timestamp indicates how long the geographical location can be relied on.

13. The method of claim 1, wherein the mechanism further authorizes the reference network device to provide its geographical location to the at least one of the one or more other network devices.

14. The method of claim 1, wherein the geographical location of the reference network device is obtained by:
obtaining a reference geographical location associated with a second reference network device;
synchronizing a first clock in the reference network device with a second clock in the second reference network device, the synchronized first and second clocks facilitating a direct one-way trip time measurement between the reference network device and the second reference network device;
obtaining a one-way distance between the reference network device and the second reference network device based on the direct one-way trip time measurement; and
obtaining the geographical location associated with the reference network device based on the reference geographical location and the one-way distance.

15. The method of claim 14, wherein the direct one-way trip time measurement is performed for both a transmit path from the reference network device and a receive path to the reference network device, and a one-way distance between the reference infrastructure network device and the second reference network device based on the direct one-way trip time measurement is determined for each of the transmit path and the receive path, the shorter of the one way distance of the transmit path and the receive path is employed to obtain the geographical location.

16. The method of claim 15, wherein the transmit path has a different transmission speed than the receive path.

17. The method of claim 14, further comprising:
determining the transmission medium between the reference network device and the second reference network device;
determining a propagation speed of the transmission medium;
obtaining a propagation time between the reference network device and the second reference network device based on the transmission medium propagation speed between the reference network device and the second reference network device; and
obtaining the geographical location associated with the reference network device based on the reference geographical location and the propagation time.

18. The method of claim 1, wherein the one or more other network devices are restricted to network devices positioned within a threshold number of network hops to the reference network device.

19. The method of claim 1, wherein a mechanism is provided to selectively identify and authenticate the at least one of the one or more other network devices as being authorized to request the geographical location.

20. The method of claim 1, wherein the mechanism selectively identifies and authenticates at least one network device as being authorized to act as the reference network device to all of the one or more other network devices.

21. The method of claim 1, wherein the mechanism comprises one or more of an authorization key or a unique key, or combinations thereof.

22. The method of claim 1, wherein the reference network device operates within a transmission line based communication network, and wherein the geographical location is provided to the at least one of the one or more other network devices on the transmission line based communication network.

23. The method of claim 1, wherein the geographical information is stored as part of a management information base of the reference network device.

24. A network device comprising:
an input interface configured to obtain a geographical location associated with the network device;
a processing circuit coupled to the input interface and configured to obtain the geographical location from the interface, store the geographical location and support a network time protocol that facilitates distance estimation between the reference network device and one or more other network devices by synchronizing their clocks; and
an output interface coupled to the processing circuit to transmit the geographical location to at least one of the one or more other network devices for determining a geographical location of the at least one of the one or more other network devices using packet exchanges based on the clock synchronization,
wherein a mechanism is provided to selectively identify and authenticate the network device as being authorized to act as a reference network device to the at least one of the one or more other network devices.

25. The network device of claim 24, wherein the processing circuit is further configured to automatically propagate the geographical information to the at least one of the one or more other network devices via the output interface.

26. The network device of claim 24, wherein the processing circuit is further configured to monitor for changes in the geographical location of the network device.

27. The network device of claim 24, wherein the input interface is coupled to one of either an internal geolocation device, an external geolocation device, or a user input device for manual entry of geolocation information.

28. The network device of claim 24, wherein the geographical location of the network device is obtained by:
   acquiring one or more reference geographical locations for other network reference devices;
   determining one or more distances from the network device to each of the other network reference devices; and
   deriving the geographical location of the network device based on the one or more reference geographical locations of the other network reference devices and the one or more distances.

29. The network device of claim 24, wherein the input interface is a local interface to couple directly to a reference infrastructure device to obtain a reference geographical location.

30. The network device of claim 29, wherein a transmission medium to the reference infrastructure device and a propagation speed of the transmission medium are determined.

31. The network infrastructure device of claim 30, wherein the transmission medium propagation speed is used to obtain a propagation time to the reference infrastructure device and the geographical location associated with the network device is obtained based on the reference geographical location and the propagation time to the reference infrastructure device.

32. The network device of claim 29, further comprising:
   a first clock to synchronize with a second clock in the reference infrastructure device, the synchronized first and second clocks facilitating a direct one-way trip time measurement between the network device and the reference infrastructure device.

33. The network device of claim 32, wherein the direct one-way trip time measurement is performed for both a transmit path from the network device and a receive path to the network device.

34. The network infrastructure device of claim 33, wherein the transmit path has a different transmission speed than the receive path.

35. The network device of claim 24, wherein the processing circuit is further configured to:
   include an indication of a level of accuracy of the geographical location in the geographical location of the reference network device, wherein the level of accuracy indicates a number of hops on the communication network that the reference network device is located from a source device with a geographic location information having a highest level of accuracy; and
   transmit the level of accuracy of the geographical location along with the geographical location.

36. An apparatus, comprising:
   means for obtaining a geographical location of a reference network device;
   means for storing the geographical location; and
   means for supporting a network time protocol that facilitates distance estimation between the reference network device and one or more other network devices by synchronizing their clocks; and
   wherein the geographical location is provided to at least one of the one or more other network devices for determining a geographical location of the at least one of the one or more other network devices using packet exchanges based on the clock synchronization; and
   wherein a mechanism is provided to selectively identify and authenticate at least one network device as being authorized to act as the reference network device to the at least one of the one or more other network devices.

37. The apparatus of claim 36, further comprising:
   means for monitoring for a change in the geographical location of the reference network device.

38. A non-transitory machine-readable storage medium having one or more instructions for enabling a network device to facilitate propagation of geographical location information, which when executed by a processor causes the processor to:
   obtain a reference geographical location associated with a second network device;
   synchronize a first clock in the network device with a second clock in the second network device, the synchronized first and second clocks facilitating a direct one-way trip time measurement between the network device and the second network device;
   obtain a one-way distance between the network device and the second network device based on the direct one-way trip time measurement using packet exchanges;
   obtain a geographical location associated with the network device based on the reference geographical location and the one-way distance; and
   provide the geographical location to a third network device to enable the third network device to obtain its own geographical location, wherein a mechanism is provided to selectively identify and authenticate the network device as being authorized to act as a reference network device to the third network device.

39. The non-transitory machine-readable storage medium of claim 38, further comprising one or more instructions to:
   acquire one or more reference geographical locations for other network infrastructure devices;
   determine one or more distances from the network device to each of the one or more reference geographical locations; and
   derive the geographical location of the network device based on the one or more reference geographical locations of the other network devices and the one or more distances.

40. The non-transitory machine-readable storage medium of claim 38, further comprising one or more instructions being further executable by the processor to:
   include an indication of a level of accuracy of the geographical location in the geographical location, wherein the level of accuracy indicates a number of hops on the communication network that the reference network device is located from a source device with a geographic location information having a highest level of accuracy; and
   provide the level of accuracy of the geographical location along with the geographical location.

41. The non-transitory machine-readable storage medium of claim 40, wherein the level of accuracy of the geographical location is determined based on one or more level of accuracy associated with one or more reference geographical locations for other network devices.

42. The non-transitory machine-readable storage medium of claim 40, further comprising one or more instructions to update the geographical location of the network device based on one or more new reference geographical locations for other network devices having associated level of accuracy, wherein the network device uses a particular reference geographical location only if its associated level of accuracy is better than the level of accuracy associated with the network device.

43. The non-transitory machine-readable storage medium of claim 38, further comprising one or more instructions to append an expiration timestamp to the geographical location provided to other network devices, wherein the expiration timestamp indicates how long the geographical location can be relied on.

44. A method for disseminating geographical location information across a communication network, comprising:

providing a reference geographical location from a reference network device to other network devices, wherein a mechanism is provided to identify and authenticate at a first network device of the other network devices as being authorized to request the reference geographical location;

synchronizing clocks between the reference network device and the first network device to facilitate a one-way trip time measurement between the reference network device and the first network device;

obtaining a distance between the reference network device and the first network device based on the one-way trip time measurement using packet exchanges occurring over the transmission lines; and obtaining a geographical location for the first network device based on the reference geographical location and the distance between the reference network device and the first network device.

45. The method of claim 44, further comprising:

compensating for time delays caused by intervening network devices between the reference network device and the first network device to enhance the accuracy of the distance between the reference network device and the first network device.

46. The method of claim 44, further comprising:

obtaining a roundtrip time measurement between the reference network device and a non-synchronized network infrastructure device;

ascertaining processing delays at the non-synchronized network infrastructure device;

obtaining a distance between the reference network device and the non-synchronized network infrastructure device based on the roundtrip time measurement and compensating for the processing delays; and obtaining a geographical location for the non-synchronized network infrastructure device based on the reference geographical location and the distance between the reference network device and the non-synchronized network infrastructure device.

47. A non-transitory machine-readable storage medium having one or more instructions which when executed by a processor causes the processor to:

obtain a geographical location of a reference network device;

store the geographical location; and support a network time protocol that facilitates distance estimation between the reference network device and one or more other network devices by synchronizing their clocks;

wherein the geographical location is provided to at least one of the one or more other network devices for determining a geographical location of the at least one of the one or more other network devices using packet exchanges based on the clock synchronization; and wherein a mechanism is provided to selectively identify and authenticate at least one network device as being authorized to act as the reference network device to the at least one of the one or more other network devices.

* * * * *